US009987802B2

(12) United States Patent
Shih et al.

(10) Patent No.: US 9,987,802 B2
(45) Date of Patent: Jun. 5, 2018

(54) METHOD FOR ADJUSTING PRINTING HEAD USAGE AMOUNT OF 3D PRINTER AND CONTROL DEVICE

(71) Applicants: XYZprinting, Inc., New Taipei (TW); Kinpo Electronics, Inc., New Taipei (TW); Cal-Comp Electronics & Communications Company Limited, New Taipei (TW)

(72) Inventors: Hsueh-Kuan Shih, New Taipei (TW); I-Feng Wu, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 38 days.

(21) Appl. No.: 14/860,720

(22) Filed: Sep. 22, 2015

(65) Prior Publication Data
US 2017/0028645 A1   Feb. 2, 2017

(30) Foreign Application Priority Data
Jul. 29, 2015   (CN) .......................... 2015 1 0454150

(51) Int. Cl.
| | |
|---|---|
| *B33Y 30/00* | (2015.01) |
| *B29C 67/00* | (2017.01) |
| *B41J 2/21* | (2006.01) |
| *B41J 2/515* | (2006.01) |
| *B33Y 50/02* | (2015.01) |

(Continued)

(52) U.S. Cl.
CPC ........ *B29C 67/0088* (2013.01); *B29C 64/112* (2017.08); *B29C 64/386* (2017.08); *B33Y 50/02* (2014.12); *B41J 2/2146* (2013.01); *B41J 2/515* (2013.01); *G05B 19/4099* (2013.01); *B33Y 10/00* (2014.12); *B33Y 30/00* (2014.12);

(Continued)

(58) Field of Classification Search
CPC ......... B33Y 10/00; B33Y 30/00; B33Y 40/00; B33Y 50/00; B33Y 50/02; B29C 67/0088; B29C 65/112; B29C 65/386; G05B 19/4099; G05B 2219/49007; G05B 2219/35134
See application file for complete search history.

(56) References Cited

U.S. PATENT DOCUMENTS 5,583,547 A * 12/1996 Gast .................. B41J 2/0457
                                                        347/22
6,033,051 A *  3/2000 Kaneko ................ B41J 2/165
                                                        347/13

(Continued)

*Primary Examiner* — David Banh
(74) *Attorney, Agent, or Firm* — JCIPRNET (57) ABSTRACT

A method for adjusting a printing head usage amount of a 3D printer and a control device are provided. The method is adapted to control the control device of the 3D printer. The method includes following steps. At least one printing head of the 3D printer is divided into a plurality of sections. An accumulated printing point number of each of the sections is obtained. At least one specific section used for printing a 3D object is selected from the sections according to the accumulated printing point number of each of the sections. The method for adjusting the printing head usage amount of the 3D printer and the control device can avoid excessively high usage amount of some nozzles.

18 Claims, 8 Drawing Sheets

(51) Int. Cl.
*G05B 19/4099* (2006.01)
*B29C 64/112* (2017.01)
*B29C 64/386* (2017.01)
*B33Y 10/00* (2015.01)

(52) U.S. Cl.
CPC ............. *G05B 2219/35134* (2013.01); *G05B 2219/49007* (2013.01)

(56) References Cited

U.S. PATENT DOCUMENTS

| | | | | |
|---|---|---|---|---|
| 6,382,764 | B1* | 5/2002 | Shimoda | B41J 2/1652 347/19 |
| 2003/0020951 | A1* | 1/2003 | Minowa | B41J 2/17566 358/1.15 |
| 2004/0207683 | A1* | 10/2004 | Sonobe | B41J 2/165 347/23 |
| 2009/0135226 | A1* | 5/2009 | Sakamoto | B41J 2/16535 347/33 |
| 2009/0167807 | A1* | 7/2009 | Kim | B41J 2/0451 347/19 |
| 2009/0174887 | A1* | 7/2009 | Arazaki | H04N 1/405 358/1.9 |

* cited by examiner

METHOD FOR ADJUSTING PRINTING HEAD USAGE AMOUNT OF 3D PRINTER AND CONTROL DEVICE

CROSS-REFERENCE TO RELATED APPLICATION

This application claims the priority benefit of China patent application serial no. 201510454150.4, filed on Jul. 29, 2015. The entirety of the above-mentioned patent application is hereby incorporated by reference herein and made a part of the specification.

BACKGROUND

Technical Field

The invention relates to a method for adjusting a printing head usage amount of a 3D printer and a control device.

Related Art

Along with quick development of electronic technology and functional progresses of various electronic devices, the electronic devices become indispensable in people's daily life. Office machines used for printing data are indispensable tools in modern offices, and the office machine is, for example, a copy machine, a printer, etc. Moreover, along with quick development of technology, people are no longer satisfied by planar copying technology only. In recent years, along with development of three-dimensional (3D) printing technology, 3D objects can also be printed and duplicated, so that it is possible to quickly and inexpensively mass-produce products.

In a conventional 2D printer or a 3D printer, a printing head used for spraying ink or consumable, an ink cartridge used for storing the ink, a consumable cartridge used for storing the consumable and other peripheral components related to the printing function are generally equipped. A control device of a printing system can be connected to the peripheral components through various connection methods, for example, through an inter-integrated circuit (I2C), a serial peripheral interface bus (SPI), or one wire, etc., and accordingly controls the peripheral components to execute a printing task.

In general use of the conventional 2D or 3D printer, a nozzle missing phenomenon is a main reason causing malfunction of the printing activity. Reasons that cause the above phenomenon are probably as follows: (1) usage frequency of a same nozzle is too high; (2) a nozzle surface is blocked by residual ink; (3) ink supply is not smooth, etc. Moreover, in order to resolve a problem of slow printing speed of the conventional 2D printer, a pagewidth printing head including a plurality of nozzles is used in the 3D printer to quickly complete printing. However, when the aforementioned nozzle missing phenomenon is encountered, it is hard to resolve or ameliorate poor inkjet quality or 3D object forming failure (for example, an inadequate adhesion strength or smooth fracture) caused by the nozzle missing phenomenon through a conventional multi-pass printing method. Therefore, to resolve or avoid the nozzle missing phenomenon becomes an important issue for related technicians of the field.

SUMMARY

The invention is directed to a method for adjusting a printing head usage amount of a 3D printer and a control device, in which the printing head is divided into a plurality of sections, and an accumulated printing point number of each section is monitored. Then, the method and the control device of the invention select a specific section used for printing according to the accumulated printing point number of each of the sections, so as to avoid excessively high usage amount of some printing heads.

The invention provides a method for adjusting a printing head usage amount of a 3D printer, which is adapted to control a control device of the 3D printer. The method includes following steps. At least one printing head of the 3D printer is divided into a plurality of sections. An accumulated printing point number of each of the sections is obtained. At least one specific section used for printing a 3D object is selected from the sections according to the accumulated printing point number of each of the sections.

In an embodiment of the invention, each of the sections includes a plurality of nozzles, the sections are arranged in a straight line, and each of the sections in the at least one printing head is fixed.

In an embodiment of the invention, when the number of the at least one printing head is greater than one, each of the printing heads individually correspond to each of the sections.

In an embodiment of the invention, the step of selecting the at least one specific section used for printing the 3D object from the sections according to the accumulated printing point number of each of the sections includes sorting the sections in an ascending order according to the accumulated printing point number of each of the sections, and selecting a predetermined number of the sections sorted in the front to serve as the at least one specific section, or sorting the sections in a descending order according to the accumulated printing point number of each of the sections, and selecting the predetermined number of the sections sorted at the back to serve as the at least one specific section.

In an embodiment of the invention, the accumulated printing point numbers of the at least one specific section are smaller than a predetermined threshold.

In an embodiment of the invention, after the step of selecting the at least one specific section used for printing the 3D object from the sections according to the accumulated printing point number of each of the sections, the method further includes following steps. A 3D configuration file of the 3D object is imported. The 3D configuration file is analyzed to obtain a size, a printing position and a layer thickness of the 3D object. The 3D configuration file is pre-cut according to the size, the printing position and the layer thickness of the 3D object, so as to estimate an added printing point number of each of the sections used for printing the 3D object at the printing position. The accumulated printing point number of each of the sections is added with the corresponding added printing point number to calculate a estimated printing point number of each section for completing printing the 3D object.

In an embodiment of the invention, after the step of adding the accumulated printing point number of each of the sections with the corresponding added printing point number to calculate the estimated printing point number of each section for completing printing the 3D object, the method further includes updating the at least one specific section according to the estimated printing point number of each of the sections.

In an embodiment of the invention, the step of updating the at least one specific section according to the estimated printing point number of each section includes sorting the sections in an ascending order according to the estimated printing point number of each of the sections, and selecting a predetermined number of the sections sorted in the front to serve as the at least one specific section, or sorting the sections in a descending order according to the estimated printing point number of each of the sections, and selecting the predetermined number of the sections sorted at the back to serve as the at least one specific section.

In an embodiment of the invention, after the step of selecting the at least one specific section used for printing the 3D object from the sections according to the accumulated printing point number of each of the sections, the method further includes only using the at least one specific section of the at least one printing head to print the 3D object.

In an embodiment of the invention, the step of only using the at least one specific section of the at least one printing head to print the 3D object includes rotating or shifting the 3D object before printing one layer of the 3D object, so as to only use the at least one specific section to print the layer.

In an embodiment of the invention, the step of rotating or shifting the 3D object includes rotating the 3D object by a predetermined angle or shifting the 3D object by a predetermined distance.

In an embodiment of the invention, the at least one specific section includes a plurality of candidate sections adjacent to each other, and the candidate sections include a plurality of positions therebetween. After the step of selecting the at least one specific section used for printing the 3D object from the sections according to the accumulated printing point number of each of the sections, the method further includes following steps. An added printing point number of each of the sections used for printing the 3D object under one of a plurality of specific states is estimated, wherein each of the specific states corresponds to a printing position of the 3D object and a specific rotation angle in a 3D space, and the printing position is one of the positions. The accumulated printing point number of each of the sections is added with the corresponding added printing point number to calculate a estimated printing point number of each section for completing printing the 3D object under the one of the specific states.

The invention provides a control device of a 3D printer. The control device includes a storage circuit and a processor. The storage circuit stores a plurality of modules. The processor is coupled to the storage circuit, and accesses and executes the modules. The modules include a dividing module, an obtaining module and a selection module. The dividing module divides a printing head of the 3D printer into a plurality of sections. The obtaining module obtains an accumulated printing point number of each of the sections. The selection module selects at least one specific section used for printing a 3D object from the sections according to the accumulated printing point number of each of the sections.

In an embodiment of the invention, the selection module is configured to sort the sections in an ascending order according to the accumulated printing point number of each of the sections, and select a predetermined number of the sections sorted in the front to serve as the at least one specific section, or sort the sections in a descending order according to the accumulated printing point number of each of the sections, and select the predetermined number of the sections sorted at the back to serve as the at least one specific section.

In an embodiment of the invention, the control device further includes a estimating module, which is configured to import a 3D configuration file of the 3D object; analyze the 3D configuration file to obtain a size, a printing position and a layer thickness of the 3D object; pre-cut the 3D configuration file according to the size, the printing position and the layer thickness of the 3D object, so as to estimate an added printing point number of each of the sections used for printing the 3D object at the printing position; and add the accumulated printing point number of each of the sections with the corresponding added printing point number to calculate a estimated printing point number of each section for completing printing the 3D object.

In an embodiment of the invention, the control device further includes an updating module, which is configured to update the at least one specific section according to the estimated printing point number of each of the sections.

In an embodiment of the invention, the updating module is configured to sort the sections in an ascending order according to the estimated printing point number of each of the sections, and select a predetermined number of the sections sorted in the front to serve as the at least one specific section, or sort the sections in a descending order according to the estimated printing point number of each of the sections, and select the predetermined number of the sections sorted at the back to serve as the at least one specific section.

In an embodiment of the invention, the control device further includes a printing module, which is configured to only use the at least one specific section of the at least one printing head to print the 3D object.

In an embodiment of the invention, the printing module is configured to rotate or shift the 3D object before printing one layer of the 3D object, so as to only use the at least one specific section to print the layer.

In an embodiment of the invention, the printing module is configured to rotate the 3D object by a predetermined angle or shift the 3D object by a predetermined distance.

In an embodiment of the invention, the at least one specific section includes a plurality of candidate sections, and the candidate sections include a plurality of positions therebetween. Moreover, the estimating module is configured to estimate an added printing point number of each of the sections used for printing the 3D object under one of a plurality of specific states, wherein each of the specific states corresponds to a printing position of the 3D object and a specific rotation angle in a 3D space, and the printing position is one of the positions; and add the accumulated printing point number of each of the sections with the corresponding added printing point number to calculate a estimated printing point number of each section for completing printing the 3D object under the one of the specific states.

According to the above descriptions, in the method for adjusting the printing head usage amount of the 3D printer and the control device of the invention, after the printing head is divided into a plurality of sections, one to a plurality of the specific sections are selected to print the 3D object according to the accumulated printing point number of each of the sections, so as to adjust the usage amount and the printing task of each of the sections.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 7A to FIG. 7C are schematic diagrams of a plurality of specific states according to an embodiment of the invention.

DETAILED DESCRIPTION OF DISCLOSED EMBODIMENTS

The present invention will now be described more fully with reference to the accompanying drawings, in which exemplary embodiments of the invention are shown. The terms used herein such as "above", "below", "front", "back", "left" and "right" are for the purpose of describing directions in the figures only and are not intended to be limiting of the invention. Moreover, in the following embodiments, the same reference numbers are used in the drawings and the description to refer to the same or like parts.

Figure 1:
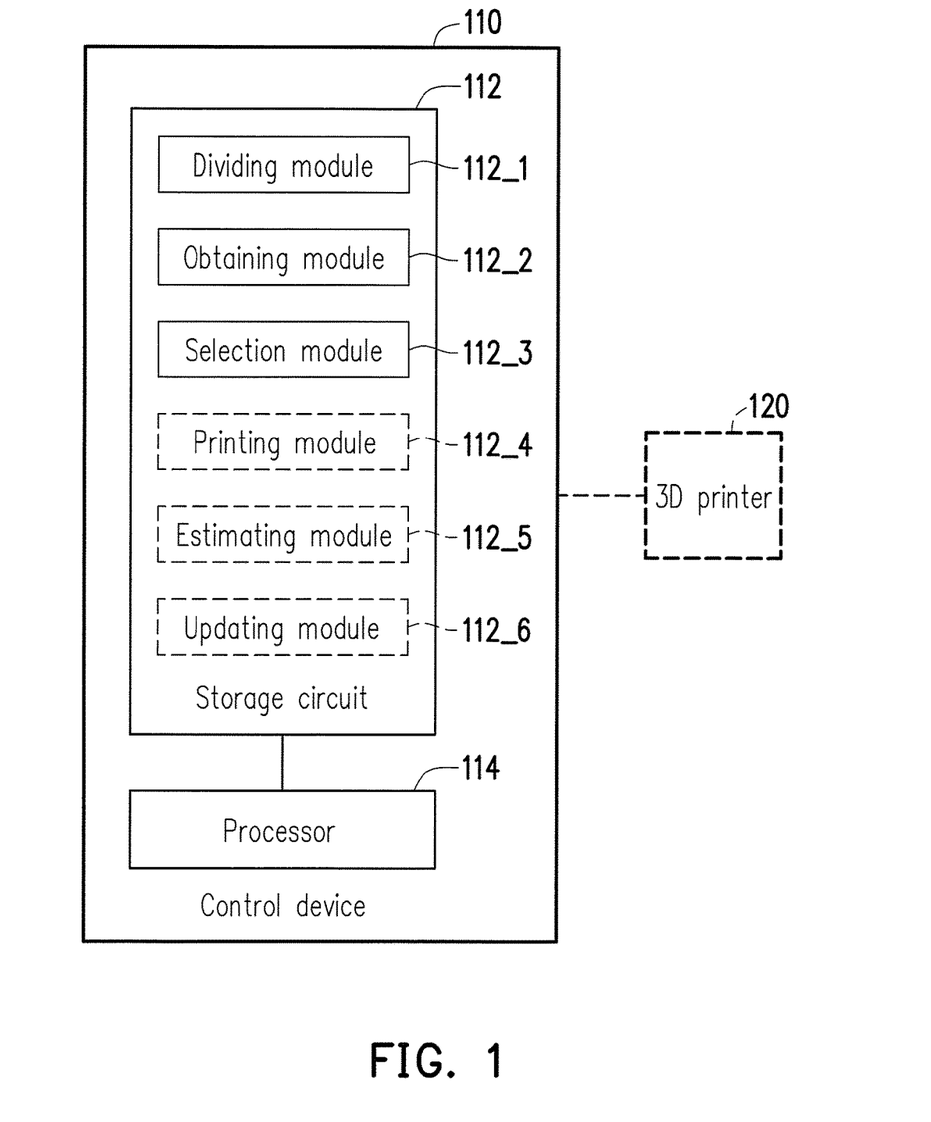
FIG. 1 is a schematic diagram of a control device according to an embodiment of the invention.

FIG. 1 is a schematic diagram of a control device according to an embodiment of the invention. In the present embodiment, the control device 110 is, for example, a mobile phone, a smart phone, a personal computer (PC), a notebook PC, a netbook PC, a tablet PC or other electronic devices capable of controlling a 3D printer 120 through, for example, an inter-integrated circuit (I2C) or a serial peripheral interface bus (SPI), etc. The control device 110 may include a storage circuit 112 and a processor 114. The storage circuit 112 is, for example, a memory, a hard disk or any other device capable of storing data, and is configured to record a plurality of program codes or modules.

The processor 114 is coupled to the storage circuit 112, and is, for example, a general purpose processor, a special purpose processor, a conventional processor, a digital signal processor, a plurality of microprocessors, one or a plurality of microprocessors combined with a digital signal processor core, a controller, a micro controller, an application specific integrated circuit (ASIC), a field programmable gate array (FPGA), another other types of IC, state machine, advanced RISC machine (ARM)-based processor and similar products.

The 3D printer 120 may have a pagewidth printing head used for spraying ink or consumable, an ink cartridge used for storing the ink, a consumable cartridge used for storing the consumable, a movable base used for placing a 3D object and other peripheral components related to the printing function, though the invention is not limited hereto.

In an embodiment, the processor 144 may access and execute a dividing module 112_1, an obtaining module 112_2 and a selection module 112_3 in the storage circuit 112 to execute a method for adjusting a printing head usage amount of the 3D printer of the invention.

Figure 2:
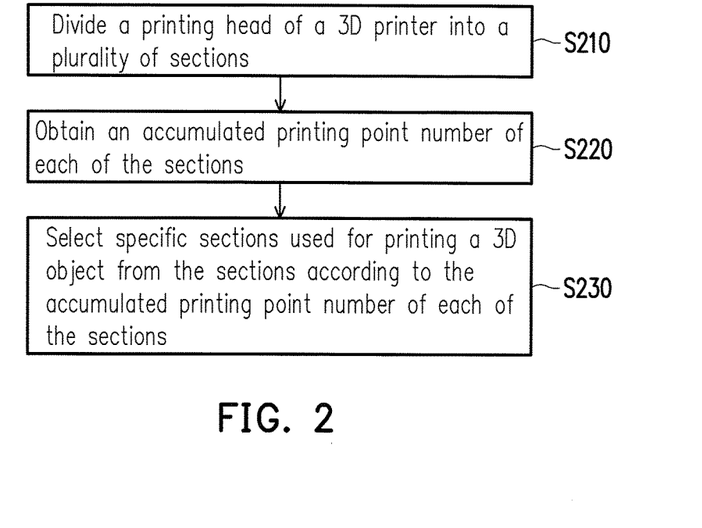
FIG. 2 is a flowchart illustrating a method for adjusting a printing head usage amount of a 3D printer according to an embodiment of the invention.

Referring to FIG. 2, FIG. 2 is a flowchart illustrating a method for adjusting a printing head usage amount of a 3D printer according to an embodiment of the invention. The method of the present embodiment can be implemented by the control device 110 of FIG. 1. Moreover, in order to clearly describe the concept of FIG. 2, a schematic diagram of a printing head of the 3D printer and accumulated printing point numbers shown in FIG. 3 is also provided, and detailed steps of the method of FIG. 2 are introduced below with reference of various components shown in FIG. 1 and FIG. 3.

In step S210, a dividing module 112_1 divides a printing head PH of the 3D printer 120 into a plurality of sections S1-S4. In the present embodiment, a direction D1 is, for example, a moving direction of the printing head PH, and each of the sections S1-S4 may include a plurality of nozzles (for example, nozzles NZ) represented by black dots. The sections S1-S4 are arranged in a straight line, and each of the sections S1-S4 of the printing head PH is fixed (i.e., non-detachable). In other words, when any one of the sections S1-S4 is required to be replaced due to malfunction, a user cannot replace the malfunctioned section alone, but replaces the whole printing head PH. Moreover, in an embodiment, the operation of the dividing module 112_1 in the step S210 is to only regard the printing head PH to include the sections S1-S4.

Figure 3:
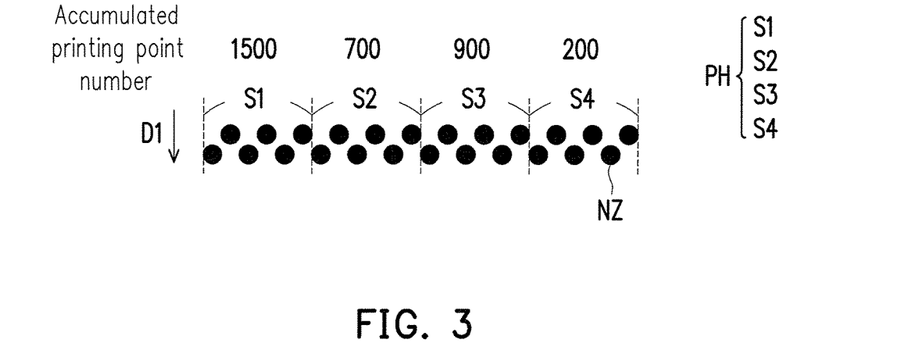
FIG. 3 is a schematic diagram of a printing head of the 3D printer and accumulated printing point numbers according to an embodiment of the invention.

Moreover, it should be noted that although a situation that the printing head PH of FIG. 3 includes four sections S1-S4 is taken as an example for description, in other embodiments, the way for dividing the printing head PH can be arbitrarily adjusted according to an actual requirement of a designer. For example, the designer can design the dividing module 112_1 to randomly or averagely distribute a width of each section, the number of the nozzles included in each section and a total number of the sections. Moreover, the designer can also arbitrarily adjust a configuration method of each nozzle according to an actual requirement other than adopting the pattern shown in FIG. 3 where the nozzles are arranged in alternation.

Then, in step S220, an obtaining module 112_2 obtains an accumulated printing point number of each of the sections S1-S4. The accumulated printing point number of each of the sections S1-S4 is, for example, a sum of usage amount (for example, an inkjet number or a number of uses) of the nozzles in each of the sections S1-S4 after the printing head PH completes a previous printing task, and the above information can be stored in the storage circuit 112 by the processor 114, though the invention is not limited thereto. In the example of FIG. 3, the accumulated printing point numbers of the sections S1-S4 are, for example, respectively 1500, 700, 900 and 200. Namely, after the printing head PH completes the previous printing task, the total number of uses of the nozzles in the section S1 is 1500, and the total number of uses of the nozzles in the section S2 is 700, and the accumulated printing point numbers of the other sections can be deduced by analogy, and details thereof are not repeated.

Then, in step S230, a selection module 112_3 selects at least one specific section used for printing the 3D object from the sections S1-S4 according to the accumulated printing point number of each of the sections S1-S4. In an embodiment, the selection module 112_3 may select several sections with the least accumulated printing point numbers from the sections S1-S4 to serve as the specific sections used for printing the 3D object.

In detail, the selection module 112_3 may sort the sections S1-S4 in an ascending order according to the accumulated printing point number of each of the sections, and select a predetermined number of the sections sorted in the front to serve as the specific sections. In FIG. 3, the sections S1-S4 sorted in the ascending order are, for example, S4, S2, S3 and S1. It is assumed that the predetermined number is 1, the selection module 112_3 may select the section S4 to serve as the specific section for printing the 3D object. Alternatively, the selection module 112_3 may sort the sections S1-S4 in a descending order according to the accumulated printing point number of each of the sections S1-S4, and select the predetermined number of the sections sorted at the back to serve as the specific sections. In this case, the sections S1-S4 sorted in the descending order are, for example, S1, S3, S2 and S4. It is assumed that the predetermined number is 1, the selection module 112_3 may still select the section S4 to serve as the specific section for printing the 3D object. Moreover, in other embodiments, the designer can also set the predetermined number to other integers (for example, 2, 3 or 4, etc.) according to an actual requirement. In this way, the individual usage amount of the sections S1-S4 can be averagely increased, so as to avoid excessively high usage amount of a same nozzle. In other words, probability of occurrence of a nozzle missing phenomenon is effectively decreased.

In another embodiment, the selection module 112_3 may only select a section with the accumulated printing point number smaller than a predetermined threshold from the sections S1-S4 to serve as the specific sections used for printing the 3D object. The predetermined threshold is, for example, set as a sum of available times (i.e., a service life) of the nozzles in the section according to an experience of the designer, or is set to other values according to an actual requirement. In other words, the selection module 112_3 may avoid selecting the sections exceeding the service life to print the 3D object, so as to decrease the probability of occurrence of the nozzle missing phenomenon.

In another embodiment, the storage circuit 112 may further include a printing module 112_4, which is configured to only use the specific section (for example, the section S1) of the printing head PH to print the 3D object. To be specific, the printing module 112_4 may rotate or shift the 3D object before printing one layer of the 3D object, so as to only use the specific section to print the layer. In an embodiment, the printing module 112_4 can rotate the 3D object by a predetermined angle or shift the 3D object by a predetermined distance. The predetermined angle is, for example, one of (for example, 45 degrees) a plurality of candidate angles (for example, 45, 90, 135, 180, 225, 270, 315 degrees, etc.), or other angles set by the designer. The predetermined distance is, for example, several ink widths or other distances set by the designer.

In other embodiments, after obtaining the accumulated printing point numbers of the sections S1-S4, the obtaining module 112_2 may control the 3D printer 120 to display the same on a screen thereof or a user interface thereof. In this way, the user can place the 3D object under the sections with less accumulated printing point numbers by himself, so that the 3D printer 120 may use these sections to print the 3D object.

In other embodiments, the method provided by the invention may further consider a structure of the 3D object. To be specific, the storage circuit 112 may further include an estimating module 112_5, which is configured to import a 3D configuration file of the 3D object. The 3D configuration file is, for example, a model of the 3D object created by using computer added design (CAD) or computer animation modelling software, and the model is converted into a file such as a standard template library (STL), etc., that can be read by the 3D printer 120.

Then, the estimating module 112_5 may analyze the 3D configuration file to obtain a size, a printing position and a layer thickness of the 3D object. The printing position is, for example, a position where the 3D object is placed when the 3D printer 120 prints the 3D object, though the invention is not limited thereto. The layer thickness is, for example, a thickness of each layer when the 3D printer 120 prints the 3D object layer-by-layer.

Then, the estimating module 112_5 may pre-cut the 3D configuration file according to the size, the printing position and the layer thickness of the 3D object, so as to estimate an added printing point number of each of the sections used for printing the 3D object at the printing position. In an embodiment, the estimating module 112_5 may implement pre-cutting the 3D configuration file by cutting the model of the 3D object into a plurality of cross-sections according to the layer thickness, though the invention is not limited thereto.

Figure 4:
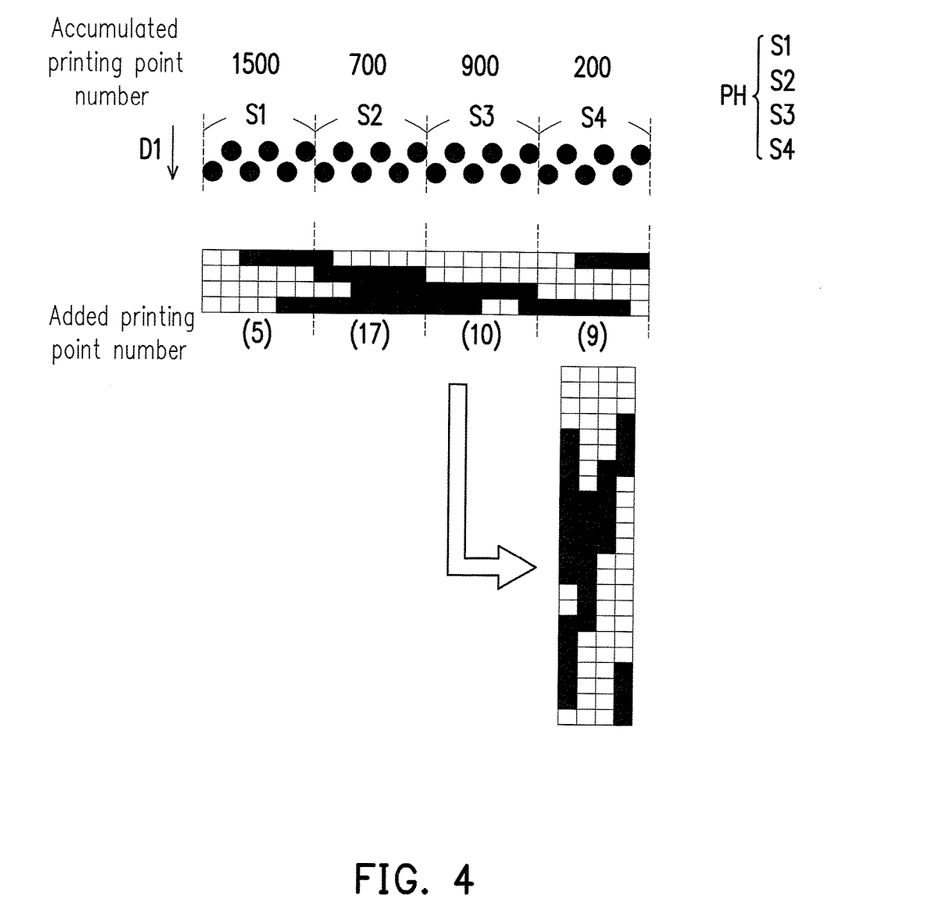
FIG. 4 is a schematic diagram of using specific sections to implement printing according to an embodiment of the invention.

Referring to FIG. 4, FIG. 4 is a schematic diagram of using the specific sections to implement according to an embodiment of the invention. Printing patterns P1-P4 shown in FIG. 4 are, for example, printing patterns of the sections S1-S4 used for printing the 3D object, where each black grid, for example, represents an ink drop (i.e., a printing point) of the 3D printer 120, though the invention is not limited thereto. In the present embodiment, the estimating module 112_5 may estimate the added printing point number of each section according to the printing patterns P1-P4. Taking the printing pattern P1 corresponding to the section S1 as an example, the printing pattern P1 includes 5 black grids, i.e., the added printing point number of the section S1 for printing the 3D object is 5. Taking the printing pattern P2 corresponding to the section S2 as an example, the printing pattern P2 includes 17 black grids, i.e., the added printing point number of the section S2 for printing the 3D object is 17. The added printing point numbers corresponding to the other printing patterns can be deduced by analogy, and details thereof are not repeated.

In the present embodiment, even if only the section S4 is used to print the 3D object, only 41 (i.e., 5+17+10+9) printing points are added, so that the 3D printer 120 can only use the section S4 to print the 3D object, as shown in FIG. 4.

In other embodiments, after considering the structure of the 3D object, the method of the invention can further adjust the specific sections used for printing the 3D object.

Figure 5:
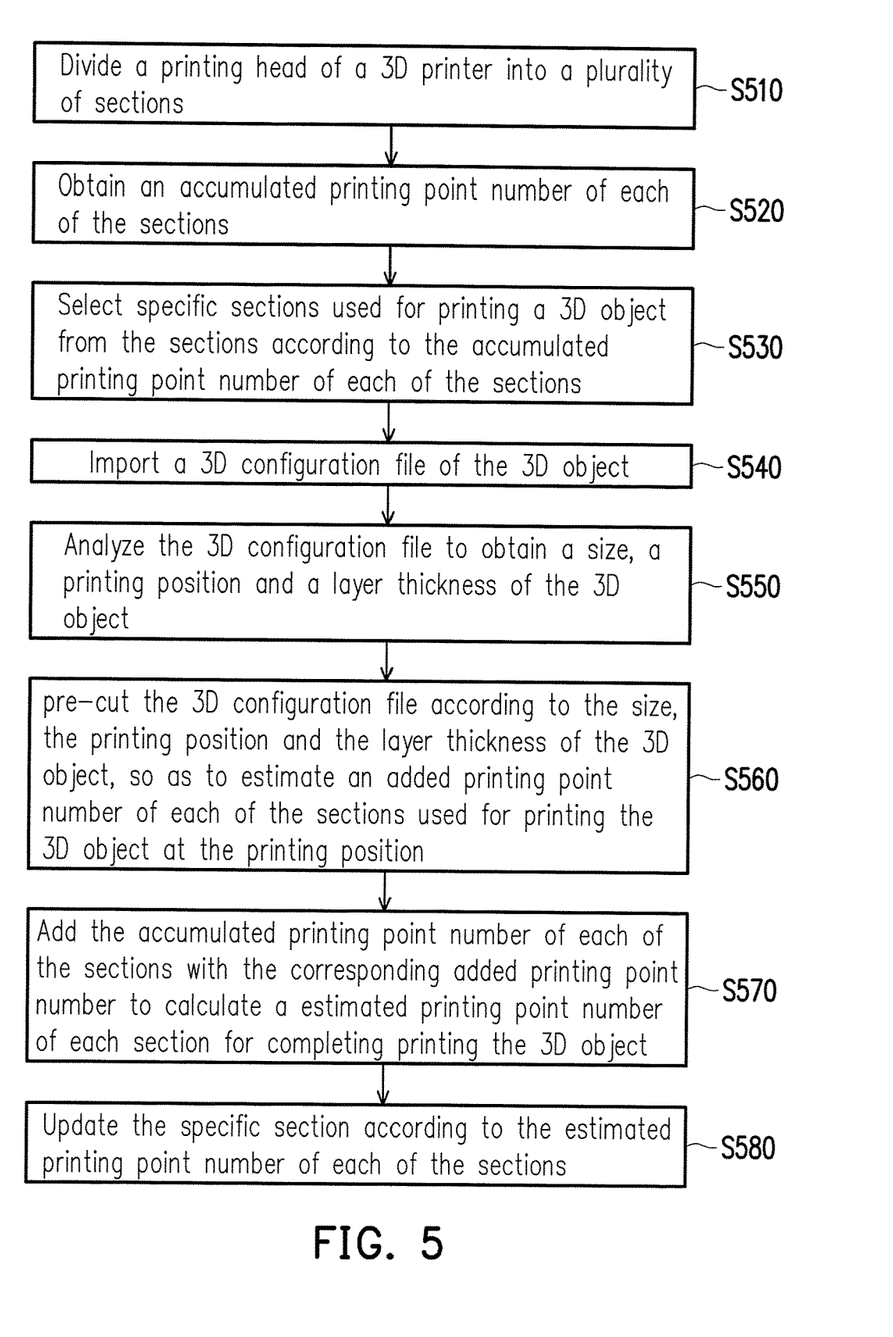
FIG. 5 is a flowchart illustrating a method for adjusting a printing head usage amount of the 3D printer according to an embodiment of the invention.
Figure 6:
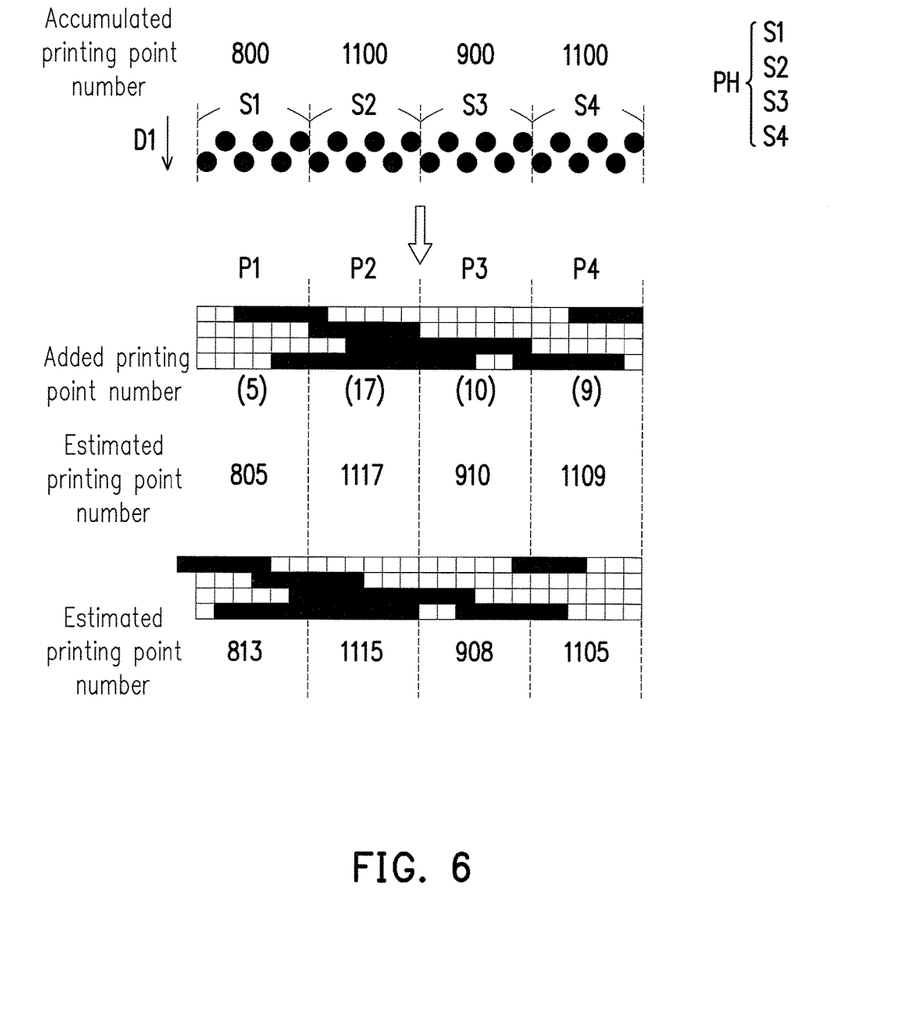
FIG. 6 is a schematic diagram of adjusting specific sections according to an embodiment of the invention.

Referring to FIG. 5, FIG. 5 is a flowchart illustrating a method for adjusting a printing head usage amount of the 3D printer according to an embodiment of the invention. The method of the present embodiment can be implemented by the control device 110 of FIG. 1. Moreover, in order to clearly describe the concept of FIG. 5, a schematic diagram of adjusting the specific sections of FIG. 6 is also provided, and detailed steps of the method of FIG. 5 are introduced below with reference of various components shown in FIG. 1 and FIG. 6.

First, in step S510, the dividing module 112_1 divides the printing head PH of the 3D printer 120 into a plurality of sections S1-S4. In step S520, the obtaining module 112_2 obtains an accumulated printing point number of each of the sections S1-S4. In step S530, the selection module 112_3 selects at least one specific section used for printing the 3D object from the sections S1-S4 according to the accumulated printing point number of each of the sections S1-S4. Details of the steps S510-S530 may refer to related descriptions of the steps S210-S230 shown in FIG. 2, which are not repeated.

Then, in step S540, the estimating module 112_5 imports a 3D configuration file of the 3D object. In step S550, the estimating module 112_5 analyzes the 3D configuration file to obtain a size, a printing position and a layer thickness of the 3D object. In step S560, the estimating module 112_5 pre-cuts the 3D configuration file according to the size, the printing position and the layer thickness of the 3D object, so as to estimate an added printing point number of each of the sections used for printing the 3D object at the printing position. Details of the steps S540-S560 may also refer to descriptions of the aforementioned embodiments, which are not repeated.

Then, in step S570, the estimating module 112_S adds the accumulated printing point number of each of the sections S1-S4 with the corresponding added printing point number to calculate an estimated printing point number of each of the sections S1-S4 for completing printing the 3D object.

Referring to FIG. 6, the printing patterns P1-P4 and the corresponding added printing point numbers thereof are the same as that shown in FIG. 4, which would not be repeated. A difference between FIG. 6 and FIG. 4 is that in FIG. 6, the accumulated printing point numbers of the sections S1-S4 are assumed to be 800, 1100, 800 and 1100. In case of FIG. 6, the estimating module 112_5 may add the accumulated printing point number (for example, 800) of the section S1 with the corresponding added printing point number (i.e., 5) to calculate the estimated printing point number (i.e., 805) of the section S1 for completing printing the 3D object. Taking the section S2 as an example, the estimating module 112_5, for example, adds the accumulated printing point number (for example, 1100) of the section S2 with the corresponding added printing point number (i.e., 17) to calculate the estimated printing point number (i.e., 1117) of the section S2 for completing printing the 3D object. The mechanism that the estimating module 112_5 calculates the estimated printing point numbers of the other sections can be deduced by analogy, which is not repeated.

In the present embodiment, the storage circuit 112 may further include an updating module 112_6, which is configured to update the specific sections according to the estimated printing point number of each of the sections S1-S4 in step S580. In an embodiment, the updating module 112_6 may sort the sections S1-S4 in an ascending order according to the estimated printing point number of each of the sections S1-S4, and select a predetermined number of the sections sorted in the front to serve as the specific sections, or sort the sections S1-S4 in a descending order according to the estimated printing point number of each of the sections S1-S4, and select the predetermined number of the sections sorted at the back to serve as the specific sections.

Alternatively, in other embodiments, the updating module 112_6 may rotate the 3D object by a predetermined angle or shift the 3D object by a predetermined distance, so as to change the printing tasks assigned to the sections S1-S4. In the embodiment of FIG. 6, the updating module 1126, for example, shift the 3D object to the left by a width of 3 black grids to change the printing tasks assigned to the sections S1-S4, such that the printing tasks of the sections S1-S4 can be more average. For example, the estimated printing point numbers of the sections S1-S4 after the updating module 112_6 shifts the 3D object are, for example, 813, 1115, 908 and 1105. Compared to the situation that the 3D object is not shifted, the printing tasks of the sections S1-S4 can be more even after the 3D object is shifted. It should be noted that a shifting range of the 3D object can be set to other predetermined distance according to an actual requirement of the designer.

Moreover, the updating module 112_6 can also rotate the 3D object by a predetermined angle, for example, 45 degrees, so as to change the printing tasks assigned to the sections S1-S4 (for example, only the sections S1 and S2 are used for printing, though the invention is not limited thereto).

In an embodiment, when the specific sections selected by the selection module 112_3 in the step S230 include a plurality of the candidate sections (for example, several sections with the least accumulated printing point numbers), the estimating module 112_5 may estimate an added printing point number of each of the sections used for printing the 3D object under one of a plurality of specific states. Then, the estimating module 112_5 adds the accumulated printing point number of each of the sections with the corresponding added printing point number to calculate a estimated printing point number of each section for completing printing the 3D object under the one of the specific states. In the present embodiment, the specific states individually correspond to a printing position of the 3D object and a specific rotation angle in a 3D space. The printing position is, for example, one of the positions between the candidate sections. The specific rogation angle is, for example, any angle that the 3D object rotates along an X-axis, a Y-axis or a Z-axis. In an embodiment, the aforementioned positions are, for example, spaced by a distance of one nozzle (i.e., one pixel) from each other, though the invention is not limited thereto. In other embodiments, the estimating module 112_5 may pre-define a normal vector (for example, a vector parallel to the Z-axis) of the 3D object based on the 3D configuration file of the 3D object, and may rotate the 3D object to the required angle by changing components of the normal vector on various dimensions of the 3D space, though the invention is not limited thereto.

Figure 7A:
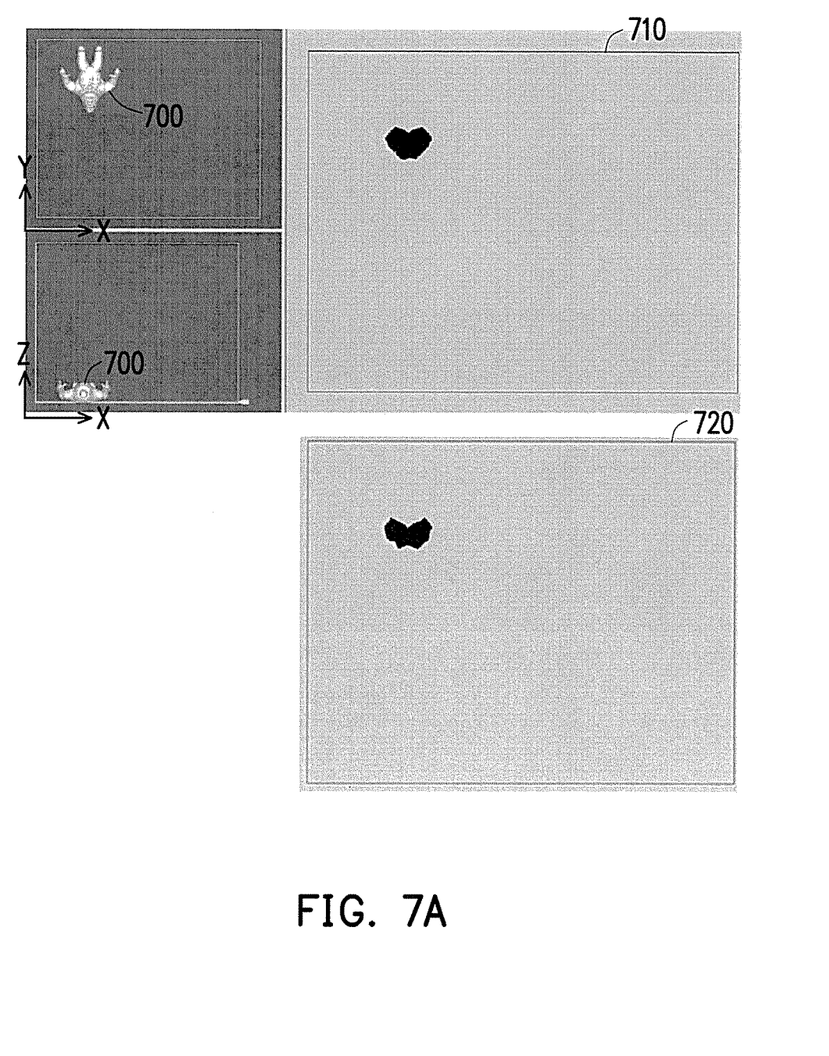
Figure 7B:
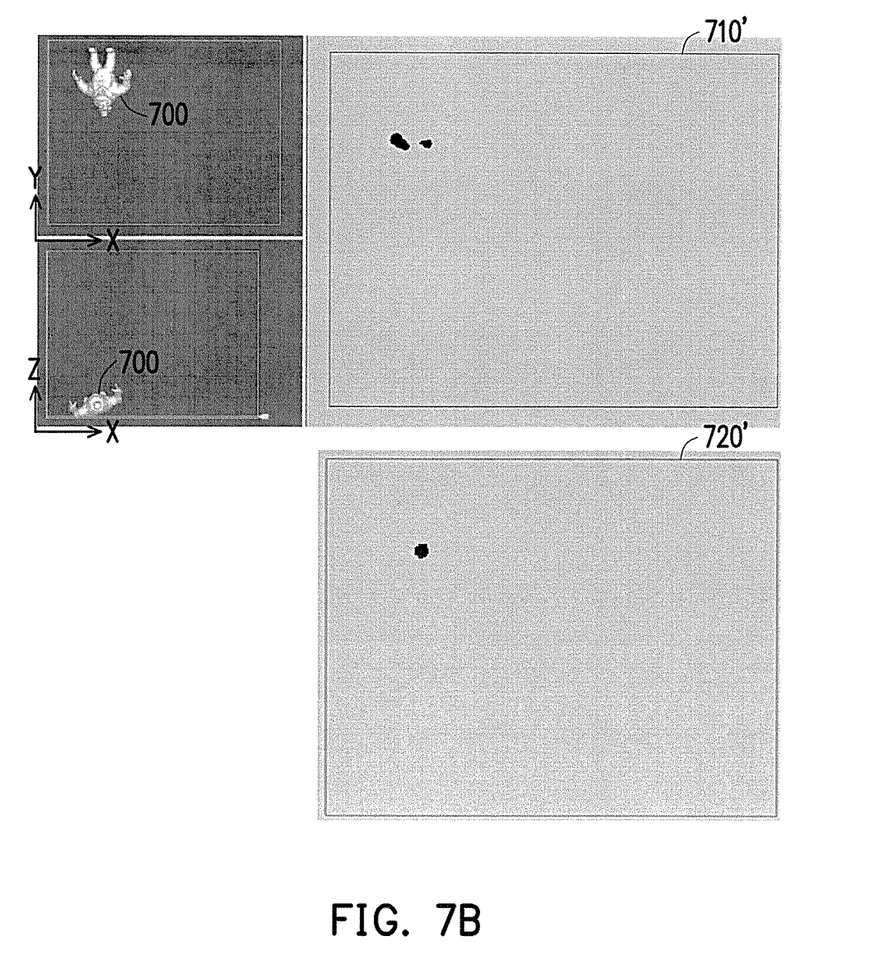
Figure 7C:
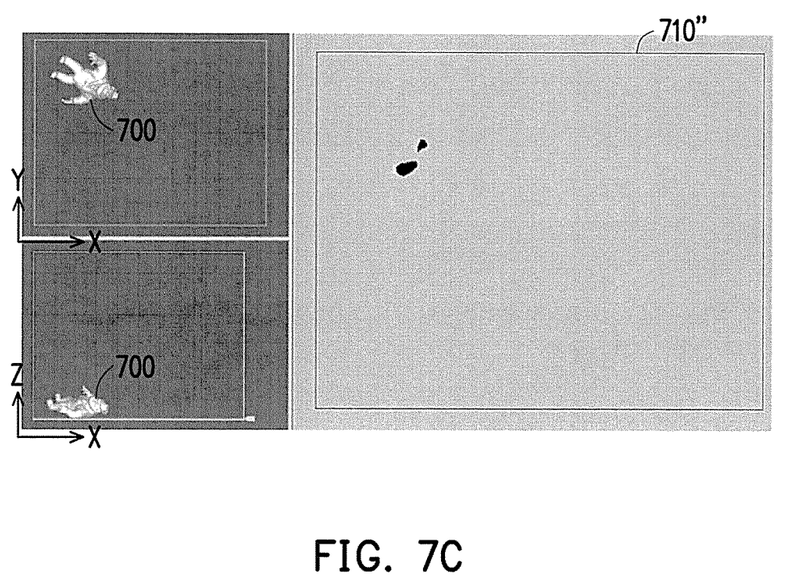

Referring to FIG. 7A to FIG. 7C, FIG. 7A to FIG. 7C are schematic diagrams of a plurality of specific states according to an embodiment of the invention. Referring to an XY view and an XZ view of FIG. 7A, in which a specific state of a non-rotated 3D object 700 is respectively illustrated, and images 710 and 720 are, for example, printing patterns of the non-rotated 3D object 700 at a $20^{th}$ layer and a $10^{th}$ layer. When the estimating module 112_5 rotates the 3D object 700 on the XZ plane anticlockwise by 20 degrees, a current state of the 3D object 700 may refer to the XY view and the XZ view of FIG. 7B. In FIG. 7B, images 710' and 720' are, for example, respectively printing patterns of the rotated 3D object 700 at the $20^{th}$ layer and the $10^{th}$ layer. When the estimating module 112_5 further rotates the 3D object 700 on the XY plane anticlockwise by 60 degrees, a current state of the 3D object 700 may refer to the XY view and the XZ view of FIG. 7C. In FIG. 7C, images 710" is, for example, a printing pattern of the further rotated 3D object 700 at the $20^{th}$ layer.

In brief, a specific state can be regarded as a specific placing mode of the 3D object in the 3D space, and the estimating module 112_5 may estimate the estimated printing point number of each section for completing printing the 3D object under various specific placing modes, and accordingly determines an actual placing mode of the 3D object when the 3D object is printed. For example, it is assumed that the estimating module 112_5 estimates that a certain placing mode of the 3D object may result in a more even estimated printing point number of each of the sections, or may avoid the estimated printing point number of a certain section from exceeding the service life, during an actual printing process, the 3D object can be adjusted to the aforementioned placing mode, so as to achieve the aforementioned effect.

In other embodiments, when the 3D printer 120 includes more than one printing head, the method provided by the invention may define each of the printing heads to individually corresponds to one section, and one to a plurality of specific sections used for printing the 3D object can also be selected according to the aforementioned descriptions. Then, each of the printing heads corresponding to the specific sections can be used to print the 3D object. In brief, the method of the invention may simultaneously control a plurality of independent printing heads to print the 3D object.

In summary, in the method for adjusting the printing head usage amount of the 3D printer and the control device of the invention, after the printing head is divided into a plurality of sections, one to a plurality of the specific sections are selected to print the 3D object according to the accumulated printing point number of each of the sections, so as to adjust the usage amount and the printing task of each of the sections. In case that the nozzles in each of the sections are fixed, the usage amount of each of the sections can be more even according to the method provided by the invention, so as to avoid the nozzle missing phenomenon caused by excessively high usage amount of some nozzles.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for adjusting a printing head usage amount of a three-dimensional (3D) printer, adapted for the controlling of a control device of the 3D printer, the method for adjusting the printing head usage amount of the 3D printer comprising:
dividing at least one printing head of the 3D printer into a plurality of sections;
obtaining an accumulated printing point number of each of the sections;
selecting at least one specific section used for printing a 3D object from the sections according to the accumulated printing point number of each of the sections; and
printing the 3D object by using the at least one specific section based on the selecting step,
wherein the step of selecting the at least one specific section used for printing the 3D object from the sections according to the accumulated printing point number of each of the sections comprises:
sorting the sections in an ascending order according to the accumulated printing point number of each of the sections, and selecting a predetermined number of front sections of the sorted sections to serve as the at least one specific section, or sorting the sections in a descending order according to the accumulated printing point number of each of the sections, and selecting the predetermined number of back sections of the sorted sections to serve as the at least one specific section, or selecting a predetermined number of sections which the accumulated printing point numbers thereof are smaller than a predetermined threshold to serve as the at least one specific section.

2. The method for adjusting the printing head usage amount of the 3D printer as claimed in claim 1, wherein each of the sections comprises a plurality of nozzles, the sections are arranged in a straight line, and each of the sections in the at least one printing head is fixed.

3. The method for adjusting the printing head usage amount of the 3D printer as claimed in claim 1, wherein when the number of the at least one printing head is greater than one, each of the printing heads individually correspond to each of the sections.

4. The method for adjusting the printing head usage amount of the 3D printer as claimed in claim 1, wherein after the step of selecting the at least one specific section used for printing the 3D object from the sections according to the accumulated printing point number of each of the sections, the method further comprises:
importing a 3D configuration file of the 3D object;
analyzing the 3D configuration file to obtain a size, a printing position and a layer thickness of the 3D object;
pre-cutting the 3D configuration file according to the size, the printing position and the layer thickness of the 3D object, so as to estimate an added printing point number of each of the sections used for printing the 3D object at the printing position; and
adding the accumulated printing point number of each of the sections with the corresponding added printing point number to calculate an estimated printing point number of each section for completing printing the 3D object.

5. The method for adjusting the printing head usage amount of the 3D printer as claimed in claim 4, wherein after the step of adding the accumulated printing point number of each of the sections with the corresponding added printing point number to calculate the estimated printing point number of each section for completing printing the 3D object, the method further comprises:
updating the at least one specific section according to the estimated printing point number of each of the sections.

6. The method for adjusting the printing head usage amount of the 3D printer as claimed in claim 5, wherein the step of updating the at least one specific section according to the estimated printing point number of each section comprises:
sorting the sections in an ascending order according to the estimated printing point number of each of the sections, and selecting a predetermined number of the sections sorted in the front to serve as the at least one specific section, or sorting the sections in a descending order according to the estimated printing point number of each of the sections, and selecting the predetermined number of the sections sorted at the back to serve as the at least one specific section.

7. The method for adjusting the printing head usage amount of the 3D printer as claimed in claim 1, wherein the step of rotating or shifting the 3D object comprises:
rotating the 3D object by a predetermined angle or shifting the 3D object by a predetermined distance.

8. The method for adjusting the printing head usage amount of the 3D printer as claimed in claim 1, wherein the at least one specific section comprises a plurality of candidate sections, and the candidate sections comprise a plurality of positions therebetween, and after the step of selecting the at least one specific section used for printing the 3D object from the sections according to the accumulated printing point number of each of the sections, the method further comprises:

estimating an added printing point number of each of the sections used for printing the 3D object under one of a plurality of specific states, wherein each of the specific states corresponds to a printing position of the 3D object and a specific rotation angle in a 3D space, and the printing position is one of the positions; and adding the accumulated printing point number of each of the sections with the corresponding added printing point number to calculate an estimated printing point number of each section for completing printing the 3D object under the one of the specific states.

9. A control device of a 3D printer, comprising:
a dividing module, dividing at least one printing head of the 3D printer into a plurality of sections;
an obtaining module, obtaining an accumulated printing point number of each of the sections;
a selection module, selecting at least one specific section used for printing a 3D object from the sections according to the accumulated printing point number of each of the sections; and
a printing module, printing the 3D object by using the at least one specific section selected by the selection module,
wherein the selection module is further configured to:
sort the sections in an ascending order according to the accumulated printing point number of each of the sections, and select a predetermined number of front sections of the sorted sections to serve as the at least one specific section, or sort the sections in a descending order according to the accumulated printing point number of each of the sections, and select the predetermined number of back sections of the sorted sections to serve as the at least one specific section, or select a predetermined number of sections which the accumulated printing point numbers thereof are smaller than a predetermined threshold to serve as the at least one specific section.

10. The control device as claimed in claim 9, wherein each of the sections comprises a plurality of nozzles, the sections are arranged in a straight line, and each of the sections in the at least one printing head is fixed.

11. The control device as claimed in claim 9, wherein when the number of the at least one printing head is greater than one, each of the printing heads individually correspond to each of the sections.

12. The control device as claimed in claim 9, further comprising:
an estimating module, configured to import a 3D configuration file of the 3D object; analyze the 3D configuration file to obtain a size, a printing position and a layer thickness of the 3D object; pre-cut the 3D configuration file according to the size, the printing position and the layer thickness of the 3D object, so as to estimate an added printing point number of each of the sections used for printing the 3D object at the printing position; and add the accumulated printing point number of each of the sections with the corresponding added printing point number to calculate a estimated printing point number of each section for completing printing the 3D object.

13. The control device as claimed in claim 12, further comprising:
an updating module, configured to update the at least one specific section according to the estimated printing point number of each of the sections.

14. The control device as claimed in claim 13, wherein the updating module is configured to sort the sections in an ascending order according to the estimated printing point number of each of the sections, and select a predetermined number of the sections sorted in the front to serve as the at least one specific section, or sort the sections in a descending order according to the estimated printing point number of each of the sections, and select the predetermined number of the sections sorted at the back to serve as the at least one specific section.

15. The control device as claimed in claim 9, wherein the printing module is configured to rotate or shift the 3D object before printing one layer of the 3D object, so as to only use the at least one specific section to print the layer.

16. The control device as claimed in claim 15, wherein the printing module is configured to rotate the 3D object by a predetermined angle or shift the 3D object by a predetermined distance.

17. The control device as claimed in claim 9, wherein the at least one specific section comprises a plurality of candidate sections, and the candidate sections comprise a plurality of positions therebetween, and the control device further comprises a estimating module, configured to:
estimate an added printing point number of each of the sections used for printing the 3D object under one of a plurality of specific states, wherein each of the specific states corresponds to a printing position of the 3D object and a specific rotation angle in a 3D space, and the printing position is one of the positions; and
add the accumulated printing point number of each of the sections with the corresponding added printing point number to calculate a estimated printing point number of each section for completing printing the 3D object under the one of the specific states.

18. The method for adjusting the printing head usage amount of the 3D printer as claimed in claim 1, wherein after the step of selecting the at least one specific section used for printing the 3D object from the sections according to the accumulated printing point number of each of the sections, the method further comprising:
rotating or shifting the 3D object before printing one layer of the 3D object, so as to use the at least one specific section of the at least one printing head to print the layer.

* * * * *